(12) United States Patent
Jones

(10) Patent No.: US 8,079,927 B2
(45) Date of Patent: Dec. 20, 2011

(54) POWER TRANSMISSION SYSTEM WITH CONTINUOUSLY VARIABLE SPEED CONTROL

(75) Inventor: Dan Jones, Valley Mills, TX (US)

(73) Assignee: Epi-Energy, Ltd., Austin, TX (US)

( * ) Notice: Subject to any disclaimer, the term of this patent is extended or adjusted under 35 U.S.C. 154(b) by 0 days.

(21) Appl. No.: 12/962,504

(22) Filed: Dec. 7, 2010

(65) Prior Publication Data

US 2011/0077118 A1    Mar. 31, 2011

Related U.S. Application Data

(63) Continuation of application No. 11/535,286, filed on Sep. 26, 2006, now Pat. No. 7,867,122.

(51) Int. Cl.
*F16H 3/72* (2006.01)
*F16H 37/06* (2006.01)

(52) U.S. Cl. .................................. 475/2; 475/5

(58) Field of Classification Search .............. 475/2, 5, 475/169, 170, 179; 180/170
See application file for complete search history.

(56) References Cited

U.S. PATENT DOCUMENTS

| | | | | |
|---|---|---|---|---|
| 2,300,343 A * | 10/1942 | Clay | ............................... | 254/340 |
| 2,948,165 A * | 8/1960 | Luthi | ............................ | 475/158 |
| 3,788,165 A * | 1/1974 | Klotsvog | ............................ | 475/2 |
| 4,484,496 A * | 11/1984 | Weis | ............................... | 475/4 |
| 5,116,292 A | 5/1992 | Han | | |
| 5,954,611 A | 9/1999 | Mills et al. | | |
| 6,329,775 B1 * | 12/2001 | Matsubara et al. | ............ | 318/376 |
| 6,550,557 B2 * | 4/2003 | Wakashiro et al. | ........ | 180/65.26 |
| 6,558,283 B1 | 5/2003 | Schnelle | | |
| 6,579,201 B2 | 6/2003 | Bowen | | |
| 6,604,591 B2 | 8/2003 | Bowen et al. | | |
| 6,879,902 B2 * | 4/2005 | Nada | ............................... | 701/93 |
| 6,962,545 B2 | 11/2005 | Larkin | | |
| 6,994,646 B2 | 2/2006 | Ai | | |
| 7,008,342 B2 | 3/2006 | Dyck et al. | | |
| 7,014,586 B2 | 3/2006 | Randall | | |
| 7,192,375 B2 * | 3/2007 | Jones | ............................ | 475/179 |
| 7,216,845 B1 * | 5/2007 | Jones | ............................ | 251/248 |
| 7,416,037 B2 * | 8/2008 | Huelser et al. | ............. | 180/65.28 |
| 2007/0225104 A1 * | 9/2007 | Jones | ............................ | 475/162 |

OTHER PUBLICATIONS

International Search Report and Written Opinion issued for PCT/US2007/079275, dated Mar. 21, 2008, 13 pages.
Press release dated Sep. 16, 2005, http://www.voith.de/press/539489.htm; last accessed Feb. 3, 2009, 2 pages.

* cited by examiner

*Primary Examiner* — Dirk Wright
(74) *Attorney, Agent, or Firm* — Fulbright & Jaworski L.L.P.

(57) ABSTRACT

The present invention is directed toward an apparatus for continuous speed variation of an output member with respect to a primary input member. In particular, the present invention provides a device having an output that rotates at reduced speed and increased torque relative to its prime input through the low friction, rolling engagement of its members, or alternatively, at increased speed and reduced torque for overdrive applications. Furthermore, the speed of the output member may be varied continuously and infinitely between the apparatus's lowest and highest ratio via a secondary input member and its low friction, rolling engagement with the device's members.

27 Claims, 4 Drawing Sheets

POWER TRANSMISSION SYSTEM WITH CONTINUOUSLY VARIABLE SPEED CONTROL

CROSS-REFERENCE TO RELATED APPLICATIONS

This application is a continuation of co-pending U.S. application Ser. No. 11/535,286, filed Sep. 26, 2006 and entitled "POWER TRANSMISSION SYSTEM WITH CONTINUOUSLY VARIABLE SPEED CONTROL," the disclosure of which is incorporated herein by reference in its entirety.

TECHNICAL FIELD

The present invention is directed toward an apparatus for continuous speed variation of an output member with respect to a prime input member. In particular, the present invention provides a device having an output that rotates at reduced speed and increased torque relative to its prime input through the low friction, rolling engagement of its members, or alternatively, at increased speed and reduced torque for overdrive applications. Furthermore, the speed of the output member may be varied continuously and infinitely between the apparatus's lowest and highest ratio via a secondary input member and its low friction, rolling engagement with the device's members.

BACKGROUND OF THE INVENTION

The ability to vary the power between an input and output shaft is vital to industries and economies throughout the world. Industries dependent on variable power transmission range from energy exploration and power generation to transportation and construction. Consequently, the applications range from stationary to mobile equipment, but the desired result remains the same, that is, to achieve the desired output of torque or speed in the most efficient manner possible.

In order to achieve these desired power transmission results a number of systems have developed over the years to vary the desired rotational speed output with respect to the prime input member in the most efficient manner possible. Most, if not all, such current systems may be classified as either stepped, conventional power transmission systems or step-less, continuously variable power transmission systems. Each of the presently available systems, whether conventional or continuously variable, have distinct advantages and corresponding disadvantages associated therewith.

First, conventional power transmission systems employ the use of multiple gear sets and clutching devices. Such systems, typically, receive input from a single source, and the speed ratio changes are accomplished in discrete steps by engaging different gears in the power transmission pathway until the output is in the vicinity of that which is desired. The output speed variation between two of the "geared" speed ratios is obtained by varying the input speed supplied by the prime mover. Consequently, the prime mover cannot always operate at its most efficient speed, resulting in a less than ideal power transmission system.

To the contrary, continuously variable transmission systems provide continuously variable speed ratio change between the minimum and maximum available speed ratios. With this type of power transmission system, the prime mover may be operated at its optimum speed for peak performance or efficiency. Presently available continuously variable transmission systems include belt systems, toroidal systems, and hydrostatic systems. These present continuously variable transmission systems provide a significant advantage over conventional systems; however, these systems are not without their own drawbacks.

Belt driven continuously variable transmissions consist essentially of a drive pulley, a belt, a driven pulley, and a control system. The drive pulley is driven by the prime mover and consists of two cones facing each other. The driven pulley transfers power to the output, and it also consists of two cones facing each other. The belt rides in the groove between the two cones of each pulley. When the two cones of the pulley are far apart (when the diameter increases), the belt rides lower in the groove, and the radius of the belt loop going around the pulley gets smaller. When the cones are close together (when the diameter decreases), the belt rides higher in the groove, and the radius of the belt loop going around the pulley gets larger. Such a continuously variable transmission system may use hydraulic pressure, centrifugal force, or spring tension to create the force necessary to adjust the pulley halves. This type of system works well for its intended purpose and provides many advantages including its efficiency and simplicity; however, several drawbacks of the belt driven continuously variable transmission exists as well. First, this type of system is typically limited to small, relatively low horsepower applications because of its reliance on the belt for full power transmission. In such a system, the belt can stretch (resulting in slippage and efficiency loss) or break resulting in complete power failure. Additionally, the system is limited by its size. The typical belt system is large in size and weight, limiting its useful applications to light stationary or light mobile equipment.

Toroidal continuously variable power transmissions works similarly to the belt system, but it replaces the belt and pulleys with discs and power rollers. The input disc is driven by the prime mover, and the output disc transfers power to the output. Rollers are located between the discs acting like the belt, in a belt system, transmitting power from the input disc to the output disc. In operation, the rollers can rotate along two separate axes. Each roller may spin around the horizontal axis and tilt in or out around the vertical axis, which allows the roller to contact the discs in different areas. When the rollers are in contact with the input disc near the center, they must contact the output disc near the rim, resulting in a reduction in speed and an increase in torque. When the rollers contact the input disc near the rim, they must contact the output disc near the center, resulting in an increase in speed and a decrease in torque. Therefore, any tilt of the rollers incrementally changes the gear ratio, providing for an infinite variation in speed ratios between the corresponding system's minimum and maximum ratio. This type of system, similarly to the belt system, suffers from drawbacks associated with its limited size and scope. Toroidal continuously variable power transmissions are unable to handle large torque loads, and are quite heavy, limiting it to light stationary and mobile equipment as well.

Finally, hydrostatic continuously variable transmission systems use variable displacement pumps to vary the fluid flow into hydrostatic motors. In this system, the rotational motion of the prime mover operates a hydrostatic pump on the input side. The pump converts the rotational motion into fluid flow; then, with a hydrostatic motor located on the output side, the fluid flow is converted back into rotational motion. However, hydrostatic drives also have several drawbacks. The hydrostatic power transmission systems are noisy and operate at very low efficiency. Therefore, they are generally used only for low speed applications such as agricultural machinery and construction equipment. Additionally, hydrostatic power transmission systems are prone to contamination, which can result in efficiency loss or catastrophic system failure.

More recent developments in step-less, continuously variable power transmission systems involve the use of electromechanical transmission systems. Many such systems operate on a power-split concept similar to hydrostatic drives. Furthermore, the typical electromechanical power transmission system integrates either single or compound planetary gear trains to achieve a continuously variable transmission of power. However, a number of inherent deficiencies exist in this type of mechanical gear train that are well known in the art. For instance, the efficiency and performance of this type of system is detrimentally impacted by the sliding frictional forces generated during its operation. In order to transfer torque, planetary gear systems depend on the sliding engagement of individual gear teeth. It is well known that this sliding produces high frictional forces between the teeth, which can lead to total destruction of the system if not continuously and properly lubricated. Furthermore, proper transfer of torque in these planetary gear systems is totally reliant on the strength of each individual gear tooth. As the input member of the system rotates at a given torque, the force from each single tooth of the input is transferred, one at a time, to each single tooth of the mating gear. As a result, each individual tooth must be designed to transfer the entire force of the system including any impact loads that may be introduced at any particular time. Additionally, any tooth breakage can lead to catastrophic failure of the entire system. Finally, traditional means of manufacturing housing and components of current planetary gear systems are not only expensive and time consuming to set up and modify, but they are also expensive and time consuming to manufacture and produce. The housing for such a system consists of two or more cast parts assembled together; therefore, in order to either originally produce housings or modify existing designs, either new molds must be manufactured or modifications must be made to existing molds. Likewise, expensive tooling and highly skilled personnel are required for both the gears themselves and other major components of a planetary gear system.

In view of the limitations of products currently known in the art, a tremendous need exists for a continuously variable transmission system that is compact, efficient, durable, reliable, cost-effective, and able to handle high power applications.

SUMMARY OF THE INVENTION

In view of the foregoing, it is an object of the present invention to provide an apparatus for power transmission that allows continuously variable speed control of the output with respect to the input.

It is another object of the present invention to provide an apparatus for power transmission that is extremely compact in size.

It is another object of the present invention to provide an apparatus for power transmission that is light in weight.

It is another object of the present invention to provide an apparatus for power transmission that is exceptionally efficient.

It is another object of the present invention to provide an apparatus for power transmission that is extremely reliable.

It is another object of the present invention to provide an apparatus for power transmission that has an excellent power to size ratio.

It is another object of the present invention to provide an apparatus for power transmission that can transmit extremely high torque loads.

It is another object of the present invention to provide an apparatus for power transmission that is extremely durable.

It is another object of the present invention to provide an apparatus for power transmission that is highly cost effective to manufacture.

In satisfaction of these and other related objectives, the present invention provides an apparatus for power transmission with continuously variable speed control of the output. This system provides for highly efficient transfer of power from a prime input member to an output member with output speed controlled via a secondary input member. As will be discussed in the specification to follow, practice of the present invention involves a combination of components so aligned to provide efficient transfer of power for a wide range of horsepower ratings and a wide range of applications, while allowing for infinite variation in output speed from a maximum speed through zero output rotation to reverse or negative output rotation, if desired.

The preferred embodiment of the present invention incorporates a power input shaft, driven by a prime mover, configured for low-friction, rolling engagement with dual, offset driver discs. In operation, as the power input shaft rotates in a given direction each driver disc is pushed outward against another low friction, rolling mechanism, driving a second member to rotate in the same direction about the input shaft and at a reduced speed and corresponding torque increase. This increased torque is further transferred via low friction, rolling engagement with a set of dual, offset driven discs. These discs, in operation, are also pushed outward against a final low friction, rolling mechanism, driving an output member to rotate in the same direction as the second member at a further reduced speed and corresponding torque increase. Hence, the result being, an output member configured to operate in the same direction as the input member, but at reduced speed and increased torque, while being operated completely through low friction, rolling engagement of their respective members.

Additionally, a second system is incorporated into the first in order to continuously vary the output speed from the maximum speed obtainable through the elimination of rotation of the output shaft in its entirety to reverse output rotation, if desired. This second system incorporates a secondary input device, driven by a secondary power source. This secondary input is configured to drive a hollow shaft member, with which the power input shaft has near frictionless engagement, while extended therethrough. This secondary input shaft incorporates two sets of dual eccentric lobe members configured for rolling engagement with the inner surfaces of the driving and driven discs of the primary system respectively. In operation, as this secondary shaft is rotated in the opposite direction of the primary, power shaft. This action, in turn, further slows the rotation of both the driving and driven disc members about the input shaft, resulting in a greater speed reduction in the output shaft. Thus, as the secondary input member's speed increases, the output shaft's speed correspondingly decreases until its rotation is completely eliminated. Furthermore, as the secondary input member's speed is further increased, the output shaft rotates in the opposite direction from that of its original direction of rotation, thus, providing breaking for the device attached to the output member.

The result is a continuously variable transmission system with capabilities unmatched by the prior art. First, through a novel configuration of components, the present invention allows the prime mover to continuously operate at the user's desired speed and torque, whether the application requires a particularly high transmission of torque throughout its specified operating speeds or whether the application calls for the prime mover to operate at its peak efficiency for maximum fuel economy. That is, in operation, the present system allows for the prime mover to be set and held at the optimum speed for which the application calls. When the secondary input member is fixed to prevent rotation of the secondary input shaft, the speed is reduced through the two (or more) stage reduction system of low friction rollers to the maximum output speed and corresponding desired torque increase of the output shaft. While holding the prime mover constant, the secondary input member, which may be driven by either an electric or hydraulic motor, is ramped up, resulting in a further reduction in speed of the output member, while keeping the output member at a constant torque. Therefore, the system allows for an infinitely variable, step-less, variation in output speed, while maintaining the prime mover at a constant speed and while maintaining the available torque to the output member at a constant level as well. Furthermore, the system can be used to retard speed or provide breaking to a device connected to the output member by continuing to ramp up the speed of the secondary input until the rotation of the output member is reversed.

Secondly, because of its compact design, and the robustness of its component parts, the present invention is able to transmit much higher torque and horsepower than current continuously variable transmission systems, while maintaining a much smaller envelope and lighter operating weight. Current continuously variable operating systems depend on sets of conical discs and either belts or rollers to transmit the torque loads. These types of systems, as previously mentioned, result in large, heavy systems compared to the torque loads they are capable of transmitting. By contrast, the present invention has an extremely high torque to size/weight ratio because the present invention is merely dependent upon the size of the driver and driven discs and the eccentricity of each. Further, because torque is transmitted by a series of low-friction rolling members, large torque transmitting members are not necessary.

Additionally, the mechanical efficiency of the present invention is extremely high because of the near elimination of friction within the system as compared to current continuously variable power transmission systems. Whereas, most continuously variable transmission systems depend on friction for the transmission of the torque, most of the newer, electromechanical systems use planetary gear systems, as previously mentioned. In the former, a reduction in friction results in slippage and a corresponding reduction in efficiency, while in the latter, a significant amount of efficiency is lost due to the "sliding" friction generated between the mating teeth. By contrast, all torque transfer in the present system is accomplished through low-friction, rolling engagement; therefore, because the present invention completely eliminates the "sliding" or slipping friction effects of the prior art, the present invention is able to operate at a significantly higher efficiency.

The present invention is also able to withstand much higher loading (including impact loading) than prior art continuously variable transmission systems. In belt systems, all loading is transferred via belts; thus, the system is limited by the tensile strength of belt materials. In toroidal systems, all loading is transferred via friction rollers; thus, the system is limited by the frictional loading between the rollers and the discs. Finally, in electromechanical gearing systems, all loading is transferred via a single gear tooth; thus, these systems are limited by the strength of materials and the loading that a single gear tooth can withstand. In the present invention, loading is evenly distributed among multiple, rolling members, which, in turn, allows the system to withstand much higher loading than its traditional counterparts. Not only does this result in a more robust system (compared to the size of the system), but it also results in a more reliable system because damage to one rolling member does not result in total system failure whereas a broken gear tooth, belt, or roller does lead to total system failure in the known prior art systems. Therefore, the present design is much more durable and reliable than currently available continuously variable transmission systems.

Finally, the present invention, in its preferred embodiment, is extremely cost effective in view of the prior art of continuously variable transmission systems. The novel design of the present invention provides for a simple and cost-effective manufacturing process as opposed to more traditional manufacturing techniques applied to current power transmission systems. Whereas the traditional manufacturing methods of casting and extensive machining of a number of different sized components is laborious, time-consuming, and expensive, the present invention requires relatively very little in the way of lead or production costs. In the present invention, both the housing and the internal components of the device are laminated. That is, each component is comprised of a plurality of relatively thin pieces of source material, generally consisting of a metal alloy or some other suitably rigid material, which are individually cut and sandwiched together using an affixing means, such as pins, screws, or other bonding techniques, to form the final primary components. Production by way of lamination greatly reduces both start up time and cost as well as production time and cost without sacrificing strength or quality. Start up time and cost are reduced by eliminating the need for long-lead casting and machining equipment. Correspondingly, production time and cost are reduced by eliminating the need for stocking and using materials of multiple thicknesses and by eliminating the need for extensive machining and highly skilled machinists to produce final primary components. Thus, when compared to the prior art continuously variable power transmission systems, the present invention provides a substantially more cost-effective device than is presently available.

In summary, the present invention provides a highly cost-effective, compact, and reliable continuously variable power transmission system capable of withstanding significantly higher torque loads than that of the prior art.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Referring to FIGS. 1 through 4, a device for continuously variable power transmission is disclosed and generally designated by numeral 10. In the preferred embodiment, the primary components of the device are laminated. That is, each component is comprised of a plurality of relatively thin pieces of source material, generally consisting of a metal alloy or some other suitably rigid material, which are individually cut and sandwiched together using affixing or bonding means to form the final primary components. Accordingly, several different source materials may be laminated into a single part or assembly as needed for the particular application. Production by way of lamination greatly reduces both start up time and cost as well as production time and cost without sacrificing strength or quality. Start up time and cost is reduced by eliminating the need for long-lead casting and machining equipment. Correspondingly, production time and cost is reduced by eliminating the need for stocking and using materials of multiple thicknesses and by eliminating the need for extensive machining and highly skilled machinists to produce final primary components.

Figure 1:
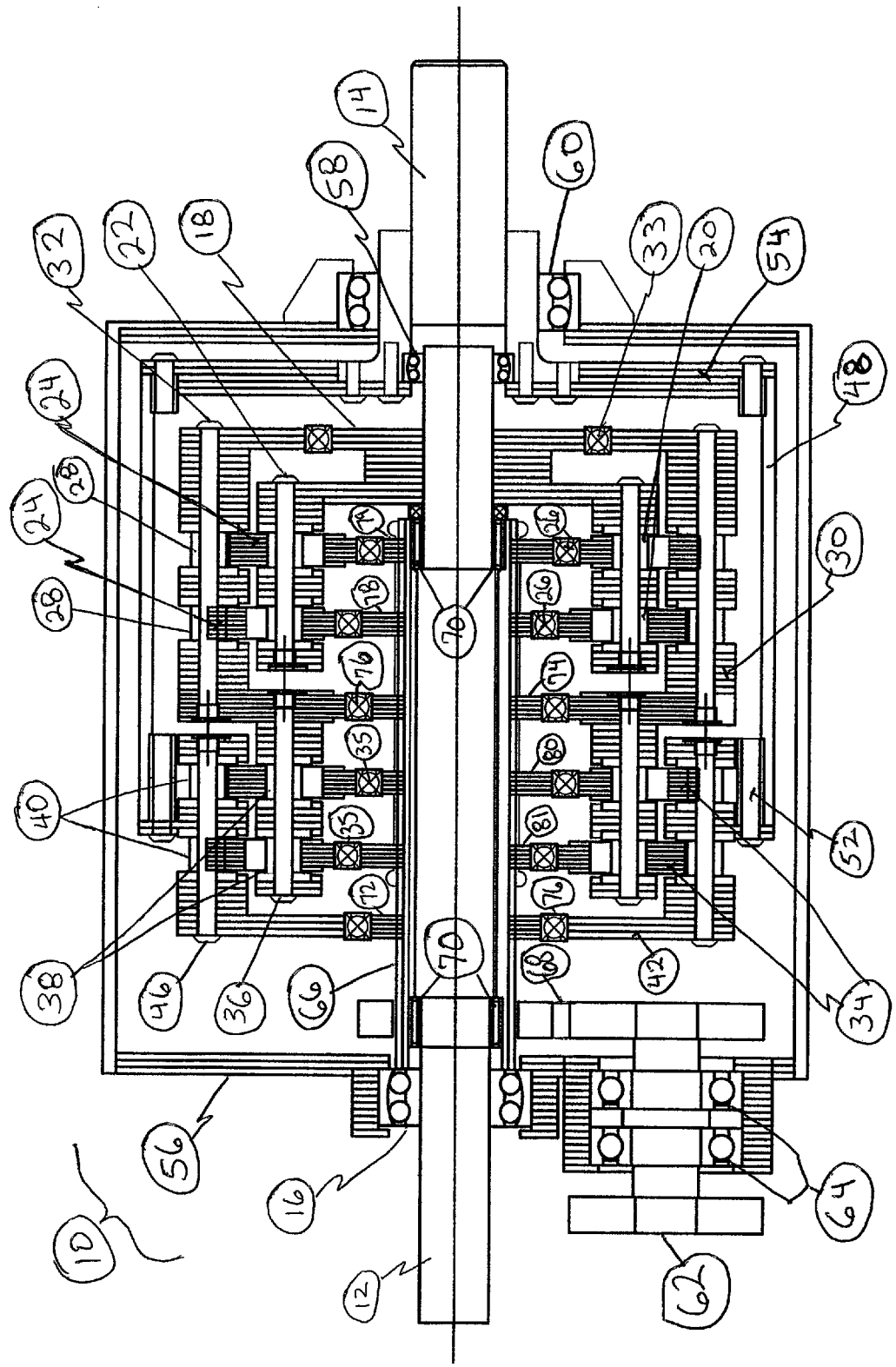
FIG. 1 is a cross-sectional view of the apparatus of the present invention.

A first embodiment of the present invention is seen in FIG. 1. This device contains a power input member 12 centrally, axially aligned with an output member 14. Power input member 12 is supported on the input side of device 10 by input bearing member 16 and is configured for engaging with any number of prime movers, such as an internal combustion engine, electric motor, hydraulic motor, or turbine engine. Following the line of power transmission, input member 12 is attached to first stage adapter member 18 via any number of attachment means as known in the art. First stage adapter member 18 is further engaged with first stage roller members 20 via first stage pin members 22. These first stage roller members 20 are configured to engage driver disc members 24 through low-friction, rolling engagement about a circular cutout machined through each driver disc 24. As can be seen in FIG. 1, each driver disc member 24 is centrally offset from primary input member 12 by the same distance in diametrically opposing directions. Additionally, each driver disc member 24 is engaged with driver disc bearing members 26 about its respective inner diameter. Bearing members 26 may be ball or roller bearings, or alternatively, wraps of roller chains. The outer diameter of driver disc members 24 is machined with rounded cutouts, or alternatively, they are machined into a sprocket shape in order to allow a "walking" engagement with external roller mechanisms. Driver disc members 24, in turn, alternately engage second roller members 28 at diametrically opposing points along the outer diameter of driver disc members 24. Correspondingly, as driver disc members 24 are forced to revolve about input member 12 in the same direction as input member 12 by way of first stage adapter member 18, driver disc members 24 are forced outward onto second roller members 28 forcing second stage adapter member 30, through its rolling engagement with second pin members 32, to rotate in the same direction as prime input member 12, but at decreased speed with a corresponding increase in torque as it "walks" around the driver disc member's 24 perimeter. Second stage adapter member 30 is otherwise configured to rotate freely about first stage adapter member 18 through their respective engagement with one another via second stage bearing member 33.

Continuing along the power path, and referring to FIG. 1, second stage adapter member 30 engages driven disc members 34 through the engagement of third pin members 36 with second stage roller members 38 along circular cutouts machined through driven disc members 34. Similar to driver disc members 24, driven disc members 34 are centrally offset from prime input member 12 by the same amount in diametrically opposing directions. Again, similar to driver disc members 24, driven disc members 34 engage driven disc bearing members 35 along the inner diameter of driven disc members 34. Also similar to driver disc members 24, the outer diameter of driven disc members 34 is machined with rounded cutouts, or alternatively, it is machined into a sprocket shaped form in order to allow a "walking" engagement with external roller mechanisms. Driven disc members 34, in turn, alternately engage output roller members 40 at diametrically opposing points along the outer diameter of driven disc members 34. Correspondingly, as driven disc members 34 are forced to revolve about input member 12 in the same direction as input member 12 by way of first stage adapter member 18 and second stage adapter member 30, driven disc members 34 are forced outward onto output roller members 40 forcing outer ring member 42, through its rolling engagement with output pin members 46 in the same direction as second stage adapter member 30, but at decreased speed with a corresponding increase in torque. Alternatively, wraps of roller chain may be substituted for pins and rollers 28, 32, 46, 40, respectively, in order to engage with a more sprocket shaped outer diameter of discs 24, 34.

Still referring to FIG. 1, and finishing out the power path, outer ring member 42 engages output ring 48 via first output ring pin members 52. Further, this reduced speed and increased torque is carried to output member 14 through output engagement means 54. Output engagement means 54 and output member 14 are otherwise configured to freely rotate about input member 12 and housing member 56 via output engagement bearing member 58 and output bearing member 60.

Next, still referring to FIG. 1, secondary input member 62 is configured within housing member 56, supported by secondary input bearing members 64. Secondary input member 62 is configured for engagement with a secondary input, such as an electric or hydraulic motor, which is used to variably reduce the output speed of device 10 from its maximum speed (attained through the above described reduction) through zero rotation to reverse rotation, if desired. In this first embodiment, continuing along the speed circuit, secondary input member 62 engages input sleeve 66 by way of belt member 68, wherein input sleeve 66 is supported by and allowed to rotate freely about input member 12 through sleeve bearings 70. Affixed to and centrally aligned with input sleeve 66 are support lobes 72 and 74 whose outer diameters engage the inner radius of outer ring member 42 and second stage adapter member 30, respectively, through lobe bearing members 76.

Continuing along the speed control circuit, first stage eccentric lobe members 78, 79 and second stage eccentric lobe members 80, 81 are affixed to input sleeve 66. Correspondingly, each pair of lobe members 78-81 has the center point of one lobe member 78, 80 offset from the central axis of input member 12 in one direction, while the other lobe member 79, 81 is centrally offset from the central axis of input member 12 an identical distance in the diametrically opposing direction.

In operation, a power drive means is applied to input member 12 through a coupling engagement as known in the art. Assuming secondary input member 62 is constrained, the input speed and torque is directly transferred with minimal efficiency loss to first stage adapter member 18 because of input member's 12 low-friction, rolling support of input bearing member 16 with respect to housing member 56, sleeve bearing members 70 with respect to constrained input sleeve 66, second stage bearing member 33 with respect to second stage adapter member 30, and output engagement bearing member 58 with respect to output engagement member 54. Progressing along the power train, the input speed and torque transfers from first stage adapter member 18 to driver disc members 24 through low-friction, rolling engagement of pin members 22 and roller members 20. As first stage adapter member 18 rotates at the same speed and torque as input member 12, roller members 20 force driver disc members 24 to rotate about eccentric lobe members 78, 79, and therefore input member 12 and constrained sleeve member 66, in a "cam-type" fashion. The disc members are allowed to rotate about eccentric lobe members 78, 79 via their rolling engagement with eccentric lobe members 78, 79 through driver disc bearing members 26. Correspondingly, as each driver disc member 24 rotates, it creates an eccentric sweep, which forces driver disc 24 outward onto roller 28. This continued rotation of disc members 24 forces disc members 24 to "walk" along rollers 28. This action forces second stage adapter member 30 to rotate (through low-friction, rolling engagement) about first stage adapter member 18 at a reduced speed and corresponding torque increase with very little efficiency loss, not only because of its low-friction rolling engagement with its driving members, but also because of its rolling engagement with central lobe member 74 via bearing member 76 and its rolling engagement with first adapter member 18 via second stage bearing member 33.

Continuing along the power train, the reduced speed and increased torque of second stage adapter member 30 is transmitted to driven disc members 34, through the low-friction rolling engagement of pin member 36 and corresponding roller members 38. The second stage speed reduction functions similarly to the first stage speed reduction. That is, as second stage adapter member 36 rotates at a reduced speed and increased torque from that of input member 12, roller members 38 force driven disc members 34 to rotate about eccentric lobe members 80, 81, and therefore input member 12 and constrained sleeve member 66, in a "cam-type" fashion. The driven disc members 34 are allowed to rotate about eccentric lobe members 80, 81 via their rolling engagement with eccentric lobe members 80, 81 through lobe bearing members 35. Furthermore, as each driven disc member 34 rotates, it creates an eccentric sweep, which forces driven disc 34 outward onto roller 40. This continued rotation of disc members 34 forces them to "walk" along rollers 40. Correspondingly, output ring member 42 is forced to rotate (through low-friction, rolling engagement) about second stage adapter member 30 at a reduced speed and corresponding torque increase with very little efficiency loss, not only because of its low-friction rolling engagement with its driving members, but also because of its rolling engagement with central lobe member 72 via bearing member 76. Finally, this second stage reduced speed and increased torque is transmitted through output ring 48 and output engagement member 54 to output member 14 with very little efficiency loss because of the support and rolling engagement of bearing member 58 with respect to input member 12 and output bearing member 60 with respect to housing member 56.

As previously mentioned, additional speed control is attained through the secondary speed circuit. As secondary input member 62 speed is ramped up, input sleeve 66 is rotated in the opposite direction from input member 12. Accordingly, eccentric lobe members 78-81 and central lobe members 72, 74 are forced to rotate at the same speed as input sleeve 66. Further, because of the rolling engagement of the outer diameter of lobe members 78-81, 72, 74 with the inner diameter of disc members 24, 34 and adapter members 30, 42, the rotation of the entire power system (excluding input member 12) is slowed. Therefore, by controlling the speed of secondary input member 62, the output speed of device 10 may be varied from its maximum speed through zero output rotation to reverse rotation, if desired.

Figure 2:
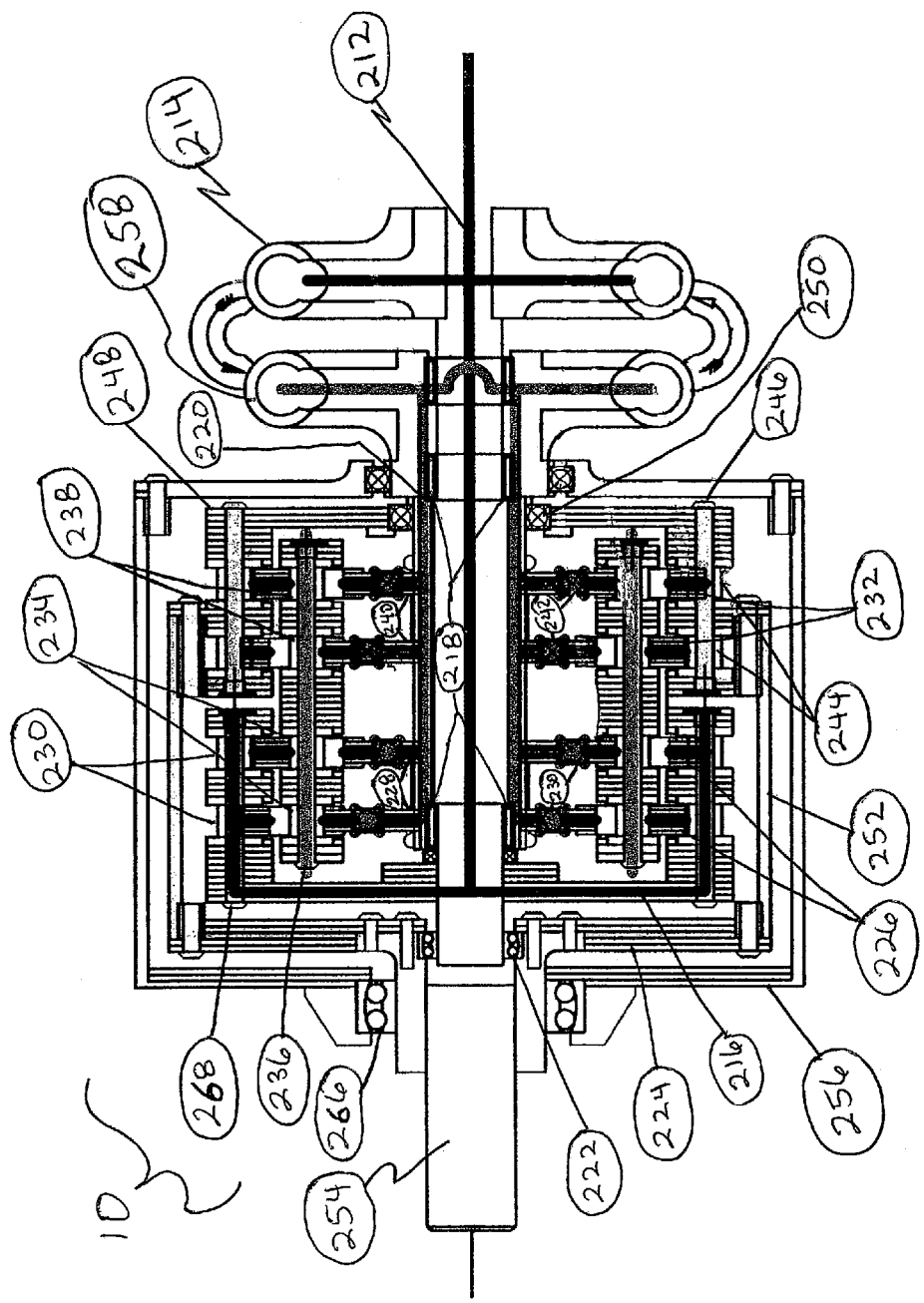
FIG. 2 is a cross-sectional view of an alternate embodiment of the present invention.

Referring next to FIG. 2, a second embodiment of the present invention is shown. In this embodiment, a power driving means is not only coupled to input member 212, but also engaged with hydraulic pump member 214. Input member 212 is thus driven at the desired input speed and torque directly and transmits the same to first stage adapter 216 with minimal efficiency loss due to its being supported by low-friction, rolling engagement of sleeve bearings 218 with respect to input sleeve 220 and output engagement bearing 222 with respect to output engagement means 224. Assuming input sleeve 220 is constrained and continuing along the power path, first stage adapter 216 transmits input speed and torque from input member 212 to driver discs 226 through low-friction, rolling engagement of first stage pin members 268 and first stage roller members 230. As first stage adapter 216 rotates, first stage roller members 230 alternately engage and "walk" the outer diameter of driver disc members 226 at diametrically opposing points, as driver discs 226 (similar to the first embodiment) are centrally offset, with respect to input member 212, the same distance in diametrically opposing directions. Therefore, as first adapter member 216 rotates, it forces driver discs 226 to eccentrically rotate at an increased speed and decreased torque about eccentric lobe members 228 via driver bearings 230 situated along the outer diameter of eccentric lobe members 228 and the inner diameter of driver discs 226. Accordingly, as in the previous embodiment, eccentric lobe members 228 are attached to input sleeve 220, and are centrally offset the same amount in diametrically opposing directions.

Next, driver discs 226 transmit this speed and torque to driven discs 232 through the low-friction, rolling engagement of driver rollers 234, driver pins 236 and driven rollers 238. As driven discs 232 are forced to rotate, they create offsetting, eccentric sweeps about eccentric lobe members 240, which are attached to input sleeve 220 and are centrally offset from the central axis of input sleeve 220 the same distance in diametrically opposing directions. Again, low-friction rolling engagement is attained between eccentric lobe members 240 and driven discs 232 via eccentric bearings 242. Accordingly, each driven disc 232 is centrally offset, with respect to input member 212, the same distance in diametrically opposing directions from one another as well. This eccentric sweeping motion forces the outer diameters of driven disc members 232 outwardly and causes engagement of the cutout or sprocket shape along second stage rollers 244 and second stage pins 246, in turn, forcing second stage adapter 248 to rotate at reduced speed and corresponding increased torque. Accordingly, minimal frictional losses are attained because all engagement is via low-friction, rolling members as opposed to traditional sliding gear members. Second stage adapter 248 is also supported by adapter bearing 250 allowing second stage adapter to rotate freely about input sleeve 220. Finally, this final speed and torque is transmitted directly through output ring 252 and output engagement member 224 to output member 254. Frictional losses are again minimized through the rolling engagement of output engagement bearing 222 with respect to input member 212 and output bearing 266 with respect to housing member 256.

In operation, the optimum input speed and torque may be attained via control over a prime driving means. As previously mentioned, this driving means also drives pump member 214. Pump member 214, in turn, through hydraulic fluid transfer, drives motor member 258. Still referring to FIG. 2, motor member 258 drives input sleeve 220 in the opposite direction of input member 212. Correspondingly, input sleeve 220 forces eccentric lobe members 228, 240 to rotate in the same direction and at the same speed as input sleeve 220. Similar to the first embodiment, as the input speed of input sleeve 220) is increased, the speed of disc members 226, 232 and second stage adapter 248 is correspondingly decreased through the engagement of the outer diameter of lobe members 228, 240 with the inner diameter of disc members 226, 232 and the engagement between input sleeve 220 and second stage adapter 248. Hence, the output speed of the second embodiment may be controlled via manipulation of fluid flow from pump member 214 to motor member 258, resulting in variation of output speed from its maximum through zero rotation to reverse rotation if necessary, while attaining constant speed and torque from the prime driving means.

Figure 3:
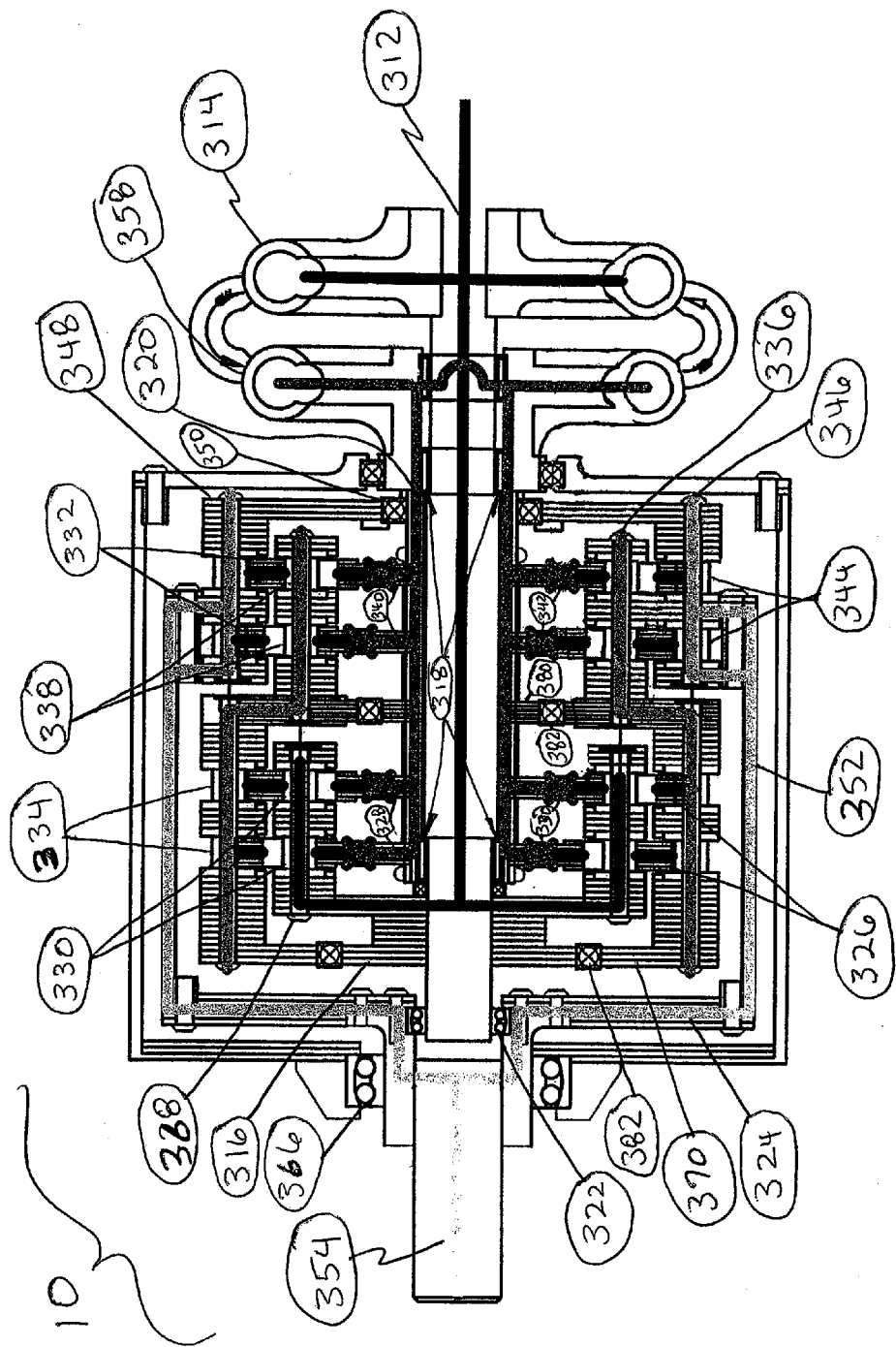
FIG. 3 is a cross-sectional view of a second alternate embodiment of the present invention.

Next, referring to FIG. 3, in the third embodiment, similar to the second embodiment, the prime driving means is coupled both to pump member 314 and input member 312. Again, minimal efficiency is lost in the initial speed and torque transfer from input member 312 to first stage adapter 316 because of the low-friction, rolling support from and engagement with input sleeve 320 through sleeve bearings 318 and second stage adapter 348 through second stage bearings 350. Following the power line and assuming input sleeve 320 is constrained, the input speed and torque is transferred from first stage adapter 316 to driver discs 326 via the low-friction rolling engagement of first stage pins 318 and first stage rollers 330. As in the previous embodiments, eccentric lobe members 328 are attached to input sleeve 320 and centrally offset by the same amount in diametrically opposing directions. Furthermore, low friction engagement between the outer diameter of eccentric lobe members 328 and driver discs 326 is achieved through lobe bearings 330. Correspondingly, disc members 326 are also centrally offset by the same amount in diametrically opposing directions. Further, as first stage adapter 316 forces each driver disc 326 to rotate about input sleeve 320, each driver disc 326 creates an eccentric sweep, forcing its cutouts or sprocket shaped outer diameter outward against second stage roller 334, resulting in second stage adapter 370 rotating about input member 312 in a "walking" motion at a reduced speed and corresponding increase in torque.

Still referring to FIG. 3 and continuing along the power line, this reduced speed and increased torque is transmitted through second stage adapter 370 to driven discs 332 through its low friction, rolling engagement with driven pins 336 and driven rollers 338. Similar to the first stage reduction, driven discs 332 are forced about their eccentric path along lobe bearings 342 and eccentric lobe members 340, which are centrally offset by the same amount in diametrically opposing directions from input sleeve 320. As the driven discs 332 rotate, each disc 332 is alternately forced outwardly into low-friction rolling engagement with output adapter 348 via output pins 346 and output rollers 344. This, in turn causes output rollers 344 to "walk" along the cutout or sprocket shaped outer diameter of driven discs 332, albeit at reduced speed and increased torque. Finally, this output torque is transmitted along output ring 352 through output engagement member 324 and to output member 354 with minimal efficiency loss due the low friction support and engagement through second stage bearing 382, output engagement bearing 322, and output bearing 366.

Continuing with FIG. 3, as in the previous embodiment, speed is controlled via pump member 314 flow control of motor member 358. Motor member, in turn, controls the speed of rotation of input sleeve 320. Input sleeve 320 is attached to eccentric lobe members 328, 340 and centrally mounted lobe member 380. Each lobe member 328, 340, 380, along its outer diameter, engages its corresponding disc member 326, 332 or adapter member 370 through rolling engagement of lobe bearings 330, 342, 382. In operation, as the speed of input sleeve 320 increases, the speed of the corresponding members 326, 332, 370, 352 decreases due to their rolling engagement. Thus, the speed of output member 354 may be varied from its maximum speed through zero rotation to reverse rotation, all while keeping the speed and torque of the prime mover constant.

Figure 4:
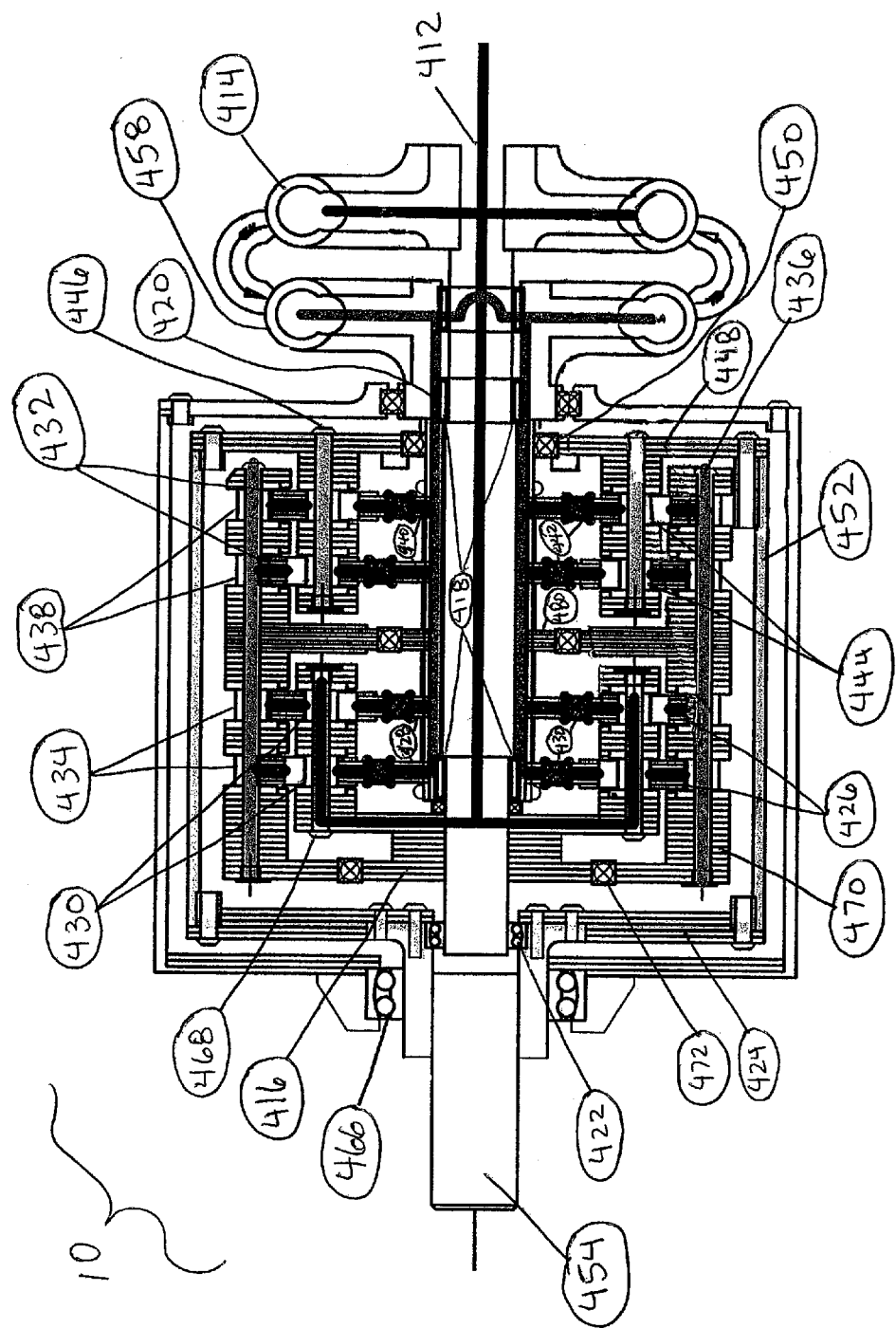
FIG. 4 is a cross-sectional view of a third alternate embodiment of the present invention.

Referring finally to FIG. 4, in the fourth embodiment, similar to the third embodiment, a power input means is coupled both to pump member 414 and input member 412. Input speed and torque is transmitted along input member 412 to first adapter member with minimal efficiency losses due to low-friction rolling support and engagement with input sleeve 420 via sleeve bearings 418, second stage adapter 470 via second stage bearings 472, and output engagement 424 via output engagement bearings 422. Still following the power line and assuming input sleeve 420 is constrained, first stage adapter member 416 transmits input speed and torque to driving disc members 426 through the low friction, rolling engagement of first stage pin members 468 and first stage roller members 430. Furthermore, as in the previous embodiments, eccentric lobe members 428 are attached to input sleeve 420 and are centrally offset by the same distance in diametrically opposing directions. Because of this configuration, as driven discs 426 are forced to rotate about their corresponding eccentric lobe member 428 through the rolling engagement of lobe bearings 430, the cutout or sprocket shaped outer diameter of driver discs 426 are forced into low-friction rolling engagement with second stage rollers 434. As driver disc 426 rotation continues, the outer diameter of driver discs 426 "walk" second stage adapter 470 about the central axis of input member 412 forcing second stage adapter 470 to rotate at a reduced speed and corresponding torque increase.

Still referring to FIG. 4 and following the power line, as second stage adapter 470 rotates at its reduced velocity and increased torque, it engages the cutout or sprocket shaped outer diameter of driven discs 432 through low friction, rolling engagement of rollers 438 and pins 436, alternately, causing each to rotate in an eccentric fashion about input sleeve 420. This rotation, in turn, through its low-friction rolling engagement via output pins 446 and rollers 444, forces output adapter 448 to rotate at increased velocity and decreased torque from that of second stage adapter 470. This output speed and torque are further transmitted to output engagement member 424 through output ring 452 and output engagement member 424, wherein, limited efficiency loss is attained because of the low-friction, rolling support of output adapter bearing 450 with respect to input sleeve 420, output engagement bearing 422 with respect to output engagement member 424, and output bearing 466 with respect to output member 454.

Still referring to FIG. 4, as in the previous embodiment, the speed of output member 454 is further controlled by controlling the flow of hydraulic fluid from pump member 414 to motor member 458. Motor member 458, in turn rotates input sleeve 420 in the opposite direction from that of the input member 412. As the speed of input sleeve 420 ramps up, the rolling contact between the outer diameter of the attached lobe members 428, 440, 480 and the inner diameter of the driver discs 426, driven discs 432, and second stage adapter 470, causes each of these components to rotate at a reduced velocity, translating in reduced output speed of output member 454. Thus, through this control circuit, the output speed of device 10 may be manipulated between device's 10 maximum speed through zero rotation to reverse rotation of the output member, while retaining a constant speed and torque (as desired) of input member 412 and the prime power driving member.

In summary, each of the embodiments described herein have displayed a double speed change and corresponding torque change in one manner or another. It is important to note that although particular stages may either increase or decrease the input torque, the size of driver discs 24, 226, 326, 426 and driven discs 34, 232, 332, 432, the number of cutouts or spokes in the outer diameter of driver discs 24, 226, 326, 426 and driven discs 34, 232, 332, 432, and the number of rollers 28, 40, 334, 344, 230, 244, 434, 438 situated along the outer perimeter of driver and driven discs 24, 34, 226, 232, 326, 332, 426, 432 dictate the specific ratio of speed reduction and torque increase achieved, or alternatively, speed increase and torque reduction in overdrive applications. Furthermore, one skilled in the art would also contemplate from the presented embodiments that the invention contemplates both additional stages of reduction in the power line of device 10 by the addition of lobe and disc members as well as numerous power line configurations based on the embodiments disclosed.

Finally, although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

What is claimed is:

1. A method for changing the rotational speed of an output, said method comprising:
   rotating a first input component;
   rotating a drive mechanism in response to rotating said first input component, wherein said drive mechanism comprises:
   a plurality of components moving eccentrically, said eccentrically moving components rotating about the axis of rotation of said first input component;
   rotating an output component in response to rotating said drive mechanism; and
   further rotating said drive mechanism in response to rotating a second input component to change the rotational speed of said output component, wherein said first and second input components rotate concurrently.

2. The method of claim 1 wherein at least one eccentrically moving component directly engages another eccentrically moving component, said direct engagement comprises a plurality of bearing members.

3. The method of claim 1 wherein rotating said drive mechanism by at least said first input component opposite to rotational direction of said second input decreases the rotational speed of said output component.

4. The method of claim 1 wherein rotating said second input component in a first direction decreases the rotational speed of said output component and rotating said second input component in a second direction increases the rotational speed of said output component.

5. The method of claim 4 wherein rotating said second input component in said first direction reverses the direction of rotation of said output component.

6. The method of claim 1 wherein said second input component comprises a shaft member and a plurality of eccentric lobe components attached to said shaft member.

7. The method of claim 6 wherein rotating said second input component engages at least one eccentric lobe component with at least one eccentrically moving component of said drive mechanism.

8. The method of claim 7 wherein said engagement comprises a plurality of bearing members.

9. The method of claim 1 wherein said first input component comprises a shaft.

10. The method of claim 1 wherein said first input component extends from inside to outside a housing and said drive mechanism is located within said housing.

11. The method of claim 1 wherein said drive mechanism comprises a plurality of stages.

12. An apparatus for controlling the rotational speed of an output, said apparatus comprising:
    a rotating first input component;
    a drive mechanism comprising a plurality of stages, said drive mechanism coupled to and having the same axis of rotation as said first input component whereby the rotation of said first input component rotates said drive mechanism;
    an output component coupled to said drive mechanism, wherein rotating said drive mechanism effectuates the rotational speed of said output component; and
    a second input component coupled to said drive mechanism, wherein rotating said second input component further rotates said drive mechanism to change the rotational speed of said output component.

13. The apparatus of claim 12 wherein said drive mechanism comprises:
    a plurality of components moving eccentrically, said eccentrically moving components rotating about the axis of rotation of said first input component.

14. The apparatus of claim 13 wherein at least one eccentrically moving component directly engages another eccentrically moving component, said direct engagement comprises a plurality of bearing members.

15. The apparatus of claim 12 wherein the rotation of said drive mechanism by at least said first input component opposite to rotational direction of said second input decreases the rotational speed of said output component.

16. The apparatus of claim 12 wherein the rotation of said second input component in a first direction decreases the rotational speed of said output component and the rotation of said second input component in a second direction increases the rotational speed of said output component.

17. The apparatus of claim 16 wherein the rotation of said second input component in said first direction reverses the direction of rotation of said output component.

18. The apparatus of claim 12 wherein said second input component comprises a shaft member and a plurality of eccentric lobe components attached to said shaft member.

19. The apparatus of claim 18 wherein rotating said second input component engages at least one eccentric lobe component with at least one eccentrically moving component of said drive mechanism.

20. The apparatus of claim 19 wherein said engagement comprises a plurality of bearing members.

21. The apparatus of claim 12 wherein said first input component comprises a shaft.

22. The apparatus of claim 12 wherein said first input component extends from inside to outside a housing and said drive mechanism is located within said housing.

23. The apparatus of claim 12 wherein said first and second input components are rotated concurrently.

24. A method for changing the rotational speed of an output in a rotationally driven system, said method comprising:

rotating a drive mechanism in response to rotating a first input component and rotating a second input component, wherein said drive mechanism comprises a plurality of components moving eccentrically, said moving components rotating about the axis of rotation of said first input component; and rotating said output component in response to rotating said drive mechanism;

wherein rotating said second input component in a first direction decreases the rotational speed of said output component and rotating said second input component in a second direction increases the rotational speed of said output component, wherein said first and second input components rotate concurrently.

25. The method of claim 24 wherein rotating said drive mechanism by at least said first input component decreases the rotational speed of said output component.

26. The method of claim 24 wherein rotating of said second input component in said first direction for a reverses the direction of rotation of said output component.

27. An apparatus for controlling the rotational speed of an output, said apparatus comprising:

a housing;

a rotating input shaft that extends from inside to outside said housing;

a drive mechanism comprising a plurality of stages, said drive mechanism coupled to and having the same axis of rotation as said first input shaft whereby the rotation of said first input shaft rotates said drive mechanism, wherein said drive mechanism is located within said housing;

an output shaft coupled to said drive mechanism, wherein rotating said drive mechanism effectuates the rotational speed of said output shaft; and a second input shaft coupled to said drive mechanism, wherein rotating said second input shaft further rotates said drive mechanism to change the rotational speed of said output shaft, wherein said first and second input shafts rotate concurrently.

* * * * *